Jan. 18, 1966  R. S. JONES  3,229,781
COMBINATION LAND AND AIR CUSHION VEHICLE
Filed July 27, 1962  6 Sheets-Sheet 1

INVENTOR
RICHARD S. JONES

BY *Larson and Taylor*
ATTORNEYS

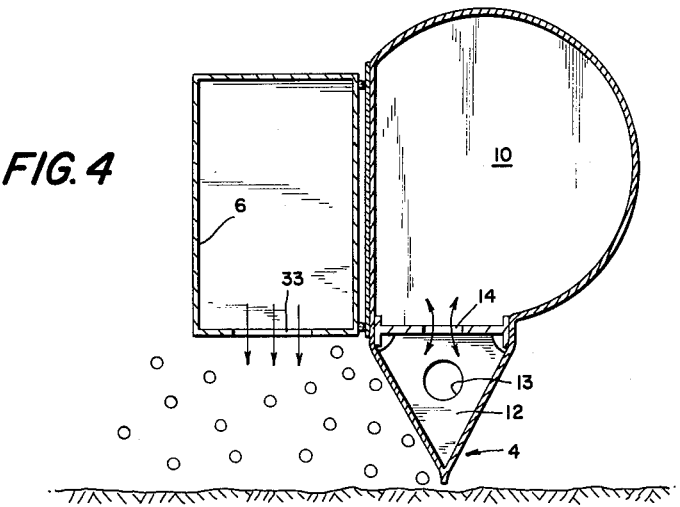
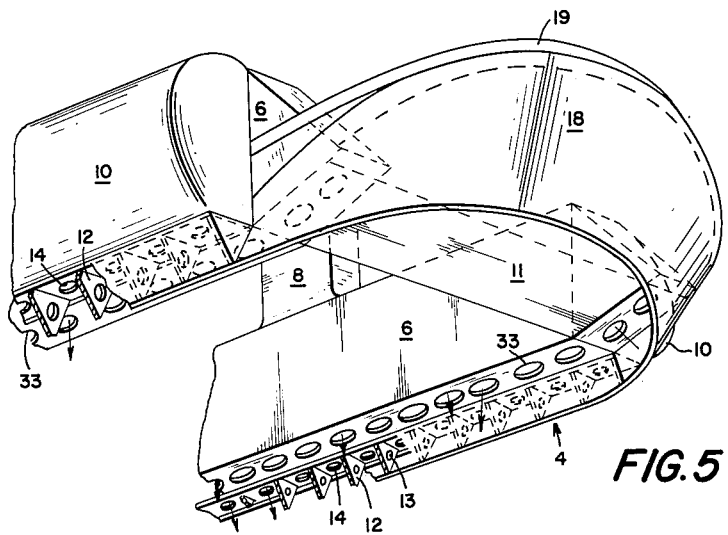

Jan. 18, 1966 R. S. JONES 3,229,781
COMBINATION LAND AND AIR CUSHION VEHICLE
Filed July 27, 1962 6 Sheets-Sheet 3

INVENTOR
RICHARD S. JONES

BY *Larson and Taylor*

ATTORNEYS

INVENTOR
RICHARD S. JONES

Jan. 18, 1966 R. S. JONES 3,229,781
COMBINATION LAND AND AIR CUSHION VEHICLE
Filed July 27, 1962 6 Sheets-Sheet 6

INVENTOR
RICHARD S. JONES

BY *Larson and Taylor*
ATTORNEYS

United States Patent Office 3,229,781
Patented Jan. 18, 1966

3,229,781
COMBINATION LAND AND AIR CUSHION VEHICLE
Richard Stanton Jones, Isle of Wight, England, assignor to Westland Aircraft Limited, Yeovil, England
Filed July 27, 1962, Ser. No. 212,978
6 Claims. (Cl. 180—7)

The weight of conventional land vehicles is supported by the groundtractive means such as the wheels or tracks. The ground surface pressures thereby exerted are comparatively large over a small area, and as a result there are many surfaces such as water, snow, sand and soft or swampy ground on which satisfactory operation cannot be normally achieved.

This invention relates to a device which provides such vehicles with a ground-effect pressurized air cushion that forms an additional medium for supporting the vehicle. It also provides a device suitable for carrying special loads without the necessity of first raising them from the ground for on loading or having to lower them when off loading.

As applied to land vhicles, the device according to the invention comprises an assembly which is adapted to be fitted around the vehicle and form a flexible base skirting suspended to encompass a space which embraces the normal platform area of the vehicle, and one or more compressors for inducing pressurized air into this space to generate a ground-effect air cushion therein which is operative, when the device is fitted to a vehicle, to reduce the surface pressure applied by ground-contact of the vehicles tractive means.

The manner in which the invention is carried into effect will naturally vary with the density of the vehicle and its shape or size, thus many variations in detail are possible. Four variants will therefore be described, by way of example only, with reference to the accompanying drawings, which also serve to illustrate subsidiary inventive features, and in which:

FIGURE 4 is a detail section IV—IV on FIGURE 2.

FIGURE 5 is an outside view on arrow V of FIGURE 1 with a portion of buoyancy compartment 10 cut away.

FIGURE 6 illustrates in side elevation and with a portion shown in part section of an embodiment of the invention as applied to a wheeled vehicle.

FIGURE 7 is a rear view of the embodiment shown in FIGURE 6.

FIGURE 8 is a plan view of the embodiment shown in FIGURE 6.

Figure 1:
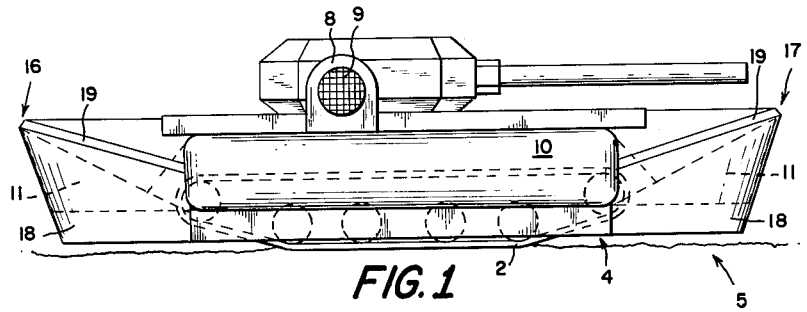
FIGURE 1 illustrates the side elevation of the invention as applied to a military tracked vehicle.

In the following description, corresponding components of all the variants are indicated by common numerals to facilitate comparison.

Referring to the drawings, it is intended that the vehicles should in general utilize their normal means of ground traction, such as wheels 1 or tracks 2, to effect forward propulsion even when the pressurized ground-effect air cushion is in operation to decrease their surface displacement. However, dependent upon the efficiency of the tractive means 1, 2, when immersed in soft or loose surfaces, such as sand or water, supplementary propulsive assistance may be necessitated by some of the operating surfaces which may be encountered. One way of providing this is to include one or more airscrew/power unit combinations 3 (FIGS. 10 to 12) as a part of the device comprised in the invention. Such an airscrew 3 can be of the variable pitch type, so providing power output variation, and can be arranged to swivel in azimuth to vary the thrust direction and so supplement directional control. FIGURE 7 shows paddles 34 attached to the wheels 1 to supplement propulsion on water.

Figure 13:
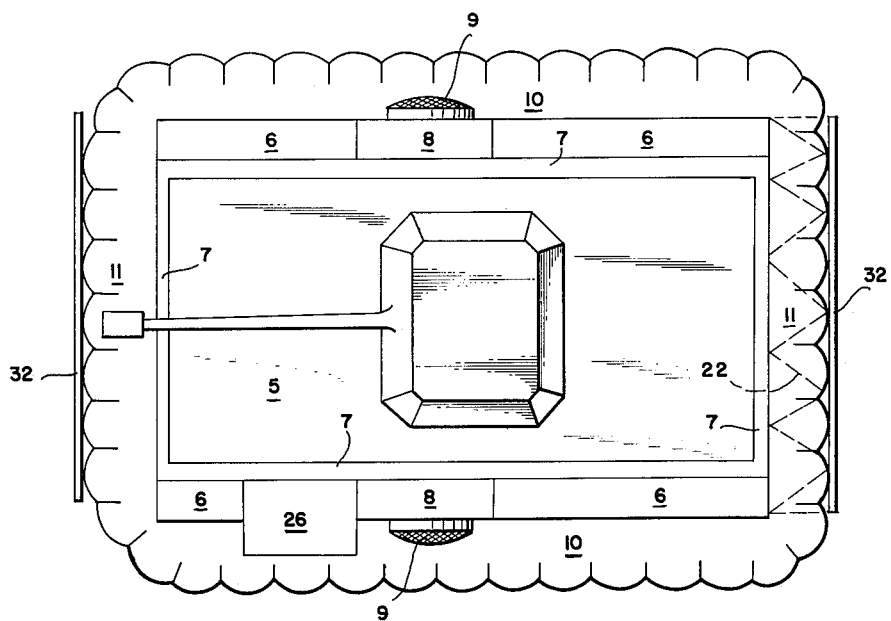
FIGURE 13 is a plan view of the invention as shown in FIGURE 11.

All variants of the invention essentially include a flexible skirting 4 which is attached to the vehicle and suspends downwardly around it to encompass a space which as shown embraces the normal platform area 5 (FIG. 8) of the vehicle and in which a ground-effect pressurised air cushion can be generated. Needles to say, and with the exception of the variant shown in FIGURE 14 where a canopy 21 is used, the flooring of the vehicle is made fluid tight to prevent upward escape and therefore dissipation of the air cushion, whilst the skirting assembly makes a fluid tight seal with the front, sides and rear of the vehicle. The air seal can be made by rigid air-duct forming a framing 6, from which the skirting 4 can be suspended, and which forms the skirt-supporting component of the assembly and is attached in fluid-tight relationship to the vehicle. Horizontal seal plates 7 (FIGURES 11 and 13) can be provided when it is considered necessary to space the skirting 4 away from the vehicle structure proper. The air-duct framing 6 forms a mounting, in the constructions illustrated, for engine/centrifugal fan units 8 which intake atmospheric air at 9 and form the compressors for generating the ground-effect air cushion.

The flexible skirting 4 can be fabricated from reinforced natural or synthetic rubber or plastic material, and suitable reinforcing materials are terylene, nylon, wire mesh or fibre glass. The guiding parameters in the selection of skirting construction and material are a flexibility necessary to allow it to deflect locally when struck by obstacles, a rigidity which resists outward deflection under the influence of the cushion pressure, and holds the skirting in the normally extended position shown in the drawings, and which impels re-assumption of that shape and position after deflection by obstacles or surface contact. These characteristics may be either inherent in the selection of the flexible material itself, or imparted to the skirting 4 by fabrication as a composite structure, for example, as shown in FIGURES 4 and 5 and later described in more detail.

When the invention is applied to heavily constructed vehicles, such as military vehicles, economy in the power requirements for generating the ground-effect pressurised air cushion can be effected by a construction in which the flexible skirting 4 is suspended to encompass a cushion area which is larger than the normal planform area of the vehicle.

For normal road usage, manoeuvrability and handling, it is desirable to restrict the beam width of the invention so nearly as possible to the beam width of the vehicle structure. This presents two problems concerned with operation on water in that the density of the vehicle will in general require the cushion area to be larger in planform than that of the vehicle structure, whilst to provide lateral stability on water by means of the air cushion it would have to be considerably wider than the beam width of the vehicle. These problems can be overcome in the first case by extending the cushion area at the bow 16 and stern 17 (FIGURES 1 and 2) to provide the major increase in area, and in the second case by providing inflatable side buoyancy compartments 10 which, when inflated, extend outwardly beyond the periphery of the cushion area and provide lateral stability in water. This enables the cushion area to be narrower than otherwise necessary, and when not operating on water the buoyancy compartments 10 can be deflated, making the whole device more compact. Preferably end buoyancy compartments 11 are additionally provided, which together with the compartments 10, enable the vehicle to float in the event of failure of the air compressor unit 8.

In the constructions illustrated in FIGURES 1 to 5, 9 to 13, and FIGURE 14, the flexible skirting 4 is hollow, as shown in sectional detail in FIGURES 4 and 5, at least along the sides of the vehicle. It has a series of spaced cross-reinforcing diaphragms or ties 12, also made of flexible material, and formed with vent holes 13. The interior of the skirting communicates between the diaphragms 12 with the side buoyancy compartments 10 via vents 14 in the supporting framework 6, and is inflated with them when required for use. The pressure of the inflation air maintains the skirting 4 in the downwardly extended position in use, and together with the construction imparts a rigidity sufficient to resist outward bending under the influence of the ground-effect air cushion pressure. However, when struck by obstacles, the skirting can deflect locally, exhausting air via the vents 14 into the buoyancy compartments 10, which form large volume air reservoirs. This increases the air pressure within the compartments 10 and by reverse action the skirting is thus biassed to reassume the normal position when obstacles are cleared.

Figure 2:
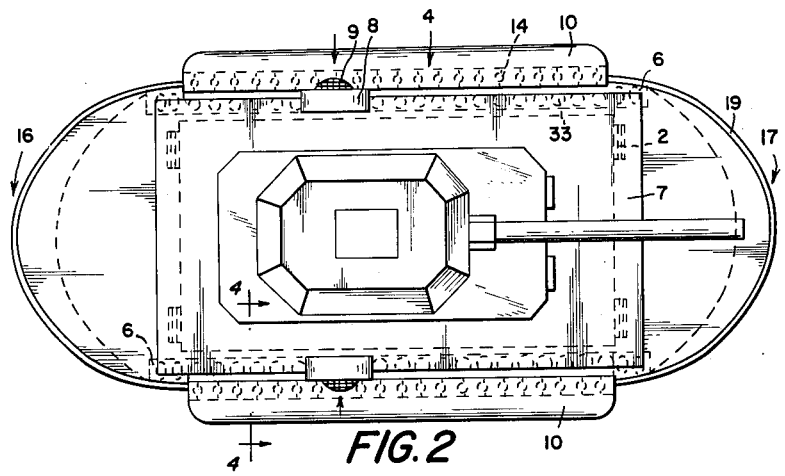
FIGURE 2 is a plan view of the invention as shown in FIGURE 1.
Figure 3:
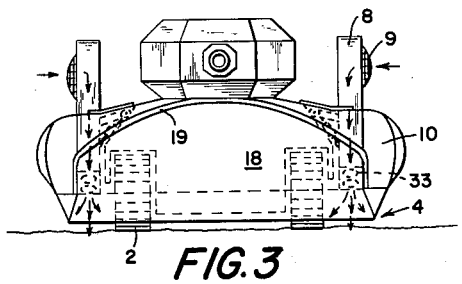
FIGURE 3 is a front elevation of the invention as shown in FIGURE 1.
Figure 9:
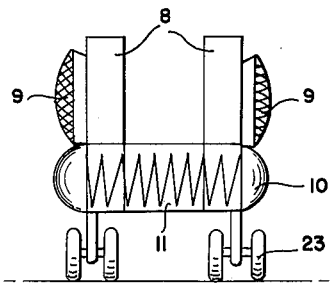
FIGURE 9 illustrates a construction of the invention in the form of a readily detachable self-supporting structure in the collapsed position which can be provided, if desired, with a self-propulsion capability.

In the construction illustrated in FIGURES 1 to 3, the part of the flexible skirting 4 around the bow 16 and stern 17 is formed by a single sheet of flexible material 18, providing greater flexibility for inward or rearward flexing to accommodate wave impact. The transition from the hollow inflatable parts of the skirting to the single sheet is illustrated in more detail in FIGURE 5. The bow and stern skirting 18 is suspended from frame members 19 which also support end buoyancy tanks or compartments 11.

Vehicles which are not inherently constructed to float are naturally provided with buoyancy arrangements such as 10 and 11. It is a feature of the invention that a substantial part, if not all, of the buoyancy arrangements 10, 11, are arranged to be operative outside the periphery of the cushion area, because not only can they then provide lateral stability on water, but the air cushion power requirement for over water operation is less than that required to support the whole weight of the vehicle. This is achieved because the buoyancy compartments 10 or 11 outside the cushion periphery are arranged below the level of the free water surface surrounding the water depression caused by the comparatively high cushion pressure required, used in conjunction with a low clearance height. The buoyancy compartments 10, 11, thus support some of the weight of the vehicle.

Figure 10:
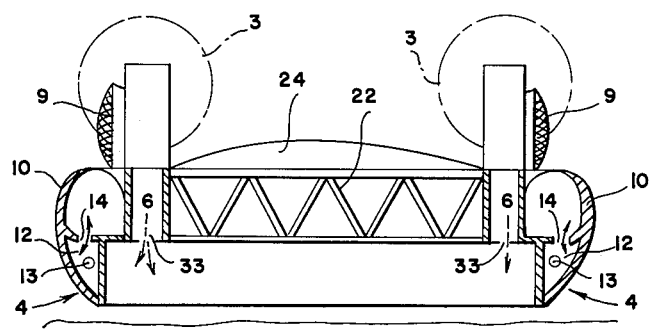
FIGURE 10 illustrates the construction of the invention as shown in FIGURE 9 in the extended position with portions in part section.
Figure 11:
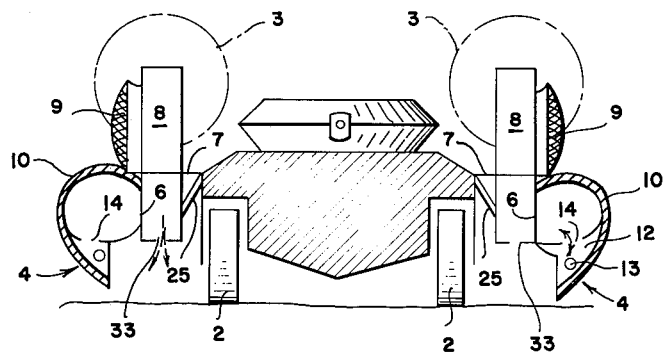
FIGURE 11 illustrates the arrangement of the construction of the invention as shown in FIGURES 9 and 10 as applied to a military track vehicle.
Figure 12:
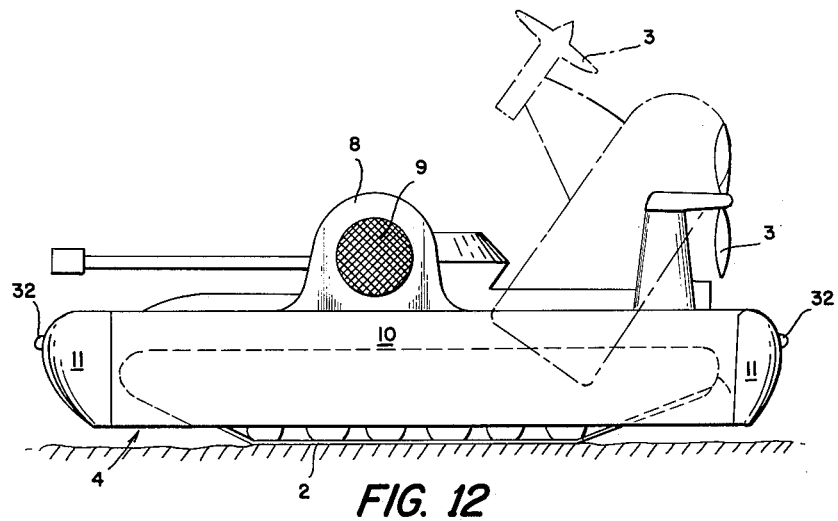
FIGURE 12 is a side elevation of the invention as shown in FIGURE 11.

The self-supporting floorless structure shown in FIGURES 9 to 13 comprises a rigid framework formed by the main air ducts 6, joined across the front and rear by lazytongs frames 22. The skirting 4 and buoyancy compartments 10 are carried by the ducts 6, whilst the end buoyancy compartments 11 contain the lazytongs 22. When the buoyancy compartments 10, 11, are deflated, external lock rods 32 (FIGURES 12 and 13) are removed, and lazytongs 22 folded, undercarriage wheels 23 (FIGURE 9) can be fitted under the ducts 6 and the device towed behind a vehicle. When the device includes airscrew propulsion units 3 and a canopy 24, which forms an air seal and is foldable, it can be self-propelled provided a suitable control position 26 (FIGURE 13) is fitted. FIGURE 10 is a front elevation in part section illustrating this mode of operation. The device is releasably fitted to a vehicle, as shown in section in FIGURE 11, by a series of links 25 at spaced intervals. Entry of the vehicle can be arranged by making one end of the device raisable as shown by chain lines in FIGURE 12.

In suitable constructions, such as that shown in FIGURES 6, 7 and 8, the links 25 can be adjustable, enabling variation of the ground clearance of the skirting 4 by raising, lowering or canting the whole assembly relatively to the vehicle. In addition, wires 27 (FIGURE 7) can be attached adjacent to the lower end of the skirting 4 and wound around a rotatable rod 28 to effect skirt retraction when not in use, i.e. during normal road operation.

To obviate delays in inflating or deflating, the buoyancy compartments, as shown in FIGURE 6, may comprise an outer part 29 which is inflated by the cushion air supply, and a valve-sealed separately inflated part 30 sufficient in volume to permit the vehicle to float if failure of the pressure air supply occurs.

Figure 14:
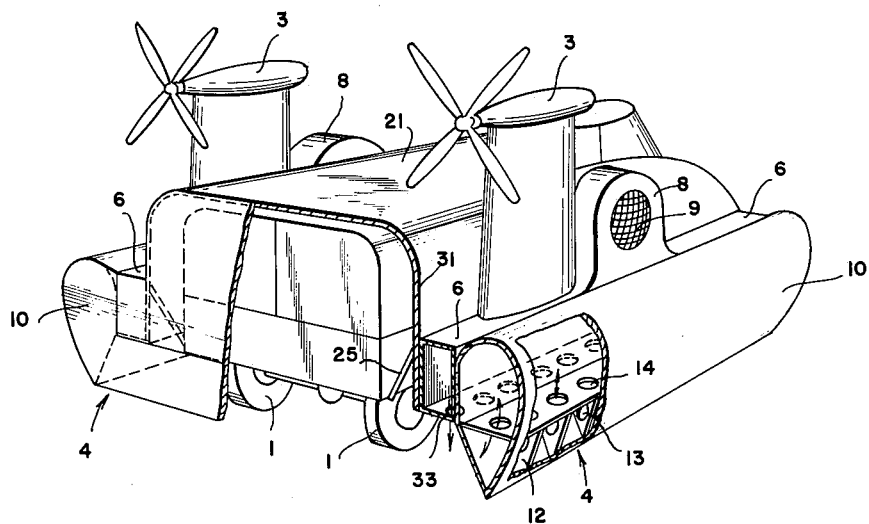
FIGURE 14 is a modification of the construction as illustrated in FIGURES 9 to 13.

FIGURE 14 shows, with one end removed, a self-propelled construction, suitable for attachment to vehicles of different sizes, and in which framework 31 joins the rigid side ducts 6 and is enclosed by the air seal canopy 21 to form a cupola like structure. One end of the device is arranged to be lifted, swung aside or removed so that a vehicle can be driven into the unit. In addition the device may be provided with small wheels so that it can be pushed over a vehicle. The vehicle is then fastened into position by the links 25. The open end of the device is then replaced, lowered down or closed, and the whole assembly forms a plenum chamber in which the vehicle is located.

In all constructions, the air ducts forming a framing 6 preferably deliver the pressurised air by direct discharge through ports 33 into the space encompassed by the skirting 4 to generate the ground-effect air cushion, as indicated by the broken line arrows, since we find this plenum chamber type operation has a number of advantages.

The particular device illustrated in FIGURE 14 could be used for moving loads, other than vehicles, without the necessity to raise them from the ground or out of the water for loading, and this is another feature of the invention. It consists of a ground-effect device, for lifting and transporting loads, comprising a floorless cupola of air impermeable wall construction formed with a flexible base rim skirting operative to retard escape of pressurised air from within the cupola, means for attaching the load to the interior of the cupola, and one or more compressors arranged to deliver a flow of pressurised air into the cupola so as to generate a pressurised ground-effect air cushion for raising the cupola and load. It is to be clearly understood that the term "cupola" has been used to define any floorless tunnel, arch, inverted-U, cup, bell, bowl, or dome-shaped structure, since the actual cupola configuration will depend upon the type and shape of the load the device is designed to lift. Some examples of loads would be small marine vessels, cylindrical, square or oblong containers or articles, tree logs, girder sections and the like.

I claim as my invention:

1. In combination, a land vehicle, traction means for propelling said vehicle on the ground, said vehicle having front, rear and side peripheral surfaces, means attached to said peripheral surfaces for decreasing the surface displacement of the land vehicle, said means comprising a flexible base skirting secured to said peripheral surfaces and extending downwardly and encompassing the vehicle and means for inducing pressurized air within said flexible skirt to generate a ground effect air cushion to reduce the surface pressure applied by ground contact of the traction means of the vehicle.

2. The combination according to claim 1 wherein said means for inducing pressurized air includes at least one air compressor.

3. The combination according to claim 1 wherein said means attached to said peripheral surfaces includes inflatable side buoyancy compartments, said compartments extending outwardly beyond the periphery of the ground effect cushion area to provide lateral stability on water.

4. The combination according to claim 1 and further including means for adjusting the ground clearance of the flexible base skirting.

5. A device of the class described comprising a vehicle, traction means for propelling said vehicle, means attached to the periphery of said vehicle for providing an air cushion beneath said vehicle, said means comprising buoyancy compartments mounted on at least one of the peripheral surfaces of said vehicles, a flexible skirting extending downwardly from said vehicle, said flexible skirting encompassing the vehicle and means for inducing pressurized air within said flexible skirt to generate a ground effect air cushion beneath said vehicle.

6. A device according to claim 5 including rigid air ducts secured to the peripheral surfaces of the vehicle, the buoyancy compartments being secured to the outer face of said ducts, said flexible skirting being hollow and including flexible diaphragms therein.

References Cited by the Examiner

UNITED STATES PATENTS

| 936,395 | 10/1909 | Worthington | 180—7 |
| 1,698,482 | 1/1929 | Nicin | 180—7 |
| 3,019,756 | 2/1962 | Murri | 180—7 |
| 3,029,042 | 4/1962 | Martin | 180—7 |
| 3,042,129 | 7/1962 | Wade | 180—7 |

FOREIGN PATENTS 1,251,967   12/1960   France.

MILTON BUCHLER, *Primary Examiner.*

A. HARRY LEVY, *Examiner.*